Figure 1:
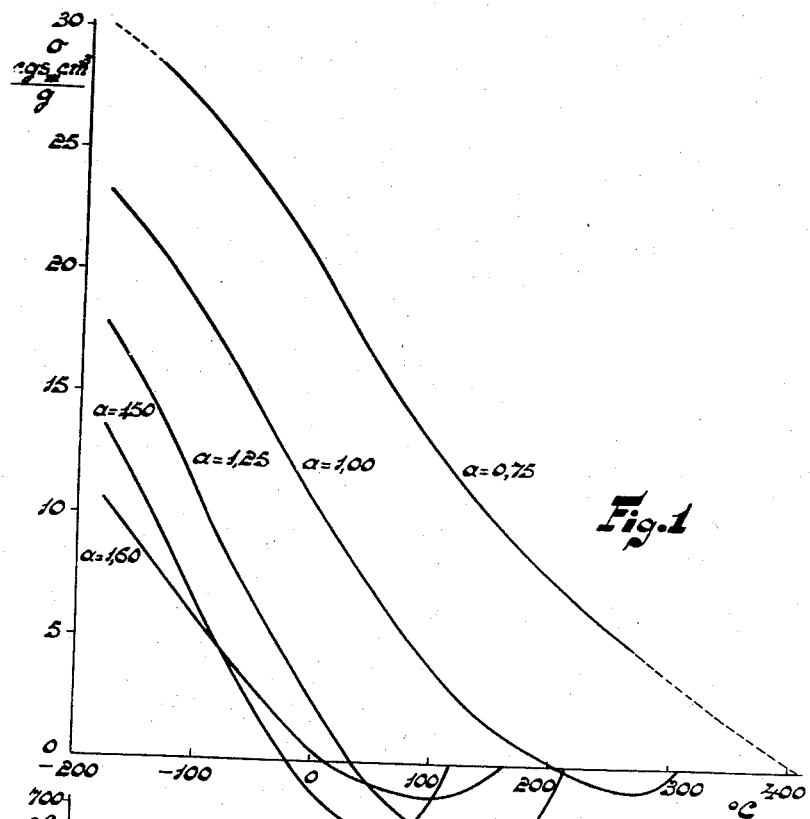

United States Patent Office 2,851,419
Patented Sept. 9, 1958

2,851,419
MAGNETIC MATERIAL AND METHOD

Evert Willem Gorter and Johannes Antonius Schulkes, Eindhoven, Netherlands, assignors, by mesne assignments, to North American Philips Company, Inc., New York, N. Y., a corporation of Delaware Application February 23, 1954, Serial No. 412,038

Claims priority, application Netherlands February 25, 1953

9 Claims. (Cl. 252—62.5)

It is known that the compound $Li_2O.5Fe_2O_3$ is strongly ferromagnetic (see, for example, "Naturwissenschaften," 26, page 431, 1938) and has a structure very closely approaching the spinel structure. By a different representation of the chemical formula of the said compound it is possible to make evident its affinity with the ferro-magnetic ferrites with spinel structure which are important in high-frequency technique and which have the formula $MFe_2O_4$, where M represents a bivalent metal such as nickel or manganese, since the chemical composition of this compound may also be expressed by the formula $(Li_{0.5}+Fe_{0.5})Fe_2O_4$. Herein the complex comprising a half atom of the monovalent lithium and a half atom of the trivalent iron substitutes one atom of the bivalent metal M of the $MFe_2O_4$. Consequently, the formula of the relative compound may also be written as $Li_{0.5}Fe_{2.5}O_4$.

According to the invention, it is possible in this compound to replace part of the iron by chromium without involving great deviations from the spinel structure, the extreme limit being a compound of the composition $Li_{0.5}Fe_{0.5}Cr_2O_4$. Neither the last-mentioned compound, nor the series of mixed crystals whose composition is located between the said limits has been described hitherto in the literature. According to the invention, in testing the said materials it has been found that those with the formula $Li_{0.5}Fe_{(2.5-a)}Cr_aO_4$, where he magnitude $a$ has a value comprised between 0.9 and 1.7, have the curious property that the remanence and hence the spontaneous magnetisation may reverse their signs by the action of variation in temperature. If such material is magnetised up to its saturation and subsequently the external magnetic field is removed, then due to an increase in temperature or a decrease in temperature (according to the value of the magnitude $a$) the remanence and hence the spontaneous magnetisation are first reduced to zero and even reverse their signs due to continued increase or decrease in temperature. The temperature at which the remanence and the spontaneous magnetisation reverse their signs for a given value of the magnitude $a$ will be referred to hereinafter as "inversion point." The absolute values of the remanence and of the spontaneous magnetisation decrease again at a still higher temperature and at least become zero at the Curie-point. Between the inversion point and the Curie-point the remanence and the spontaneous magnetisation reach maximum values which are highest for materials of which the magnitude $a$ has a value comprised between 1.1 and 1.5.

The above-mentioned property of the series of materials previously referred to permits their use for temperature indication. The "inversion point" previously defined is naturally important, which point may be adjusted to any desired temperature between approximately $-25°$ C. and $+225°$ C. by suitable choice of the value of the magnitude $a$ which has also been defined before.

In manufacturing the compounds concerned from the oxides of iron, chromium and lithium or from compounds which can pass into the said oxides upon heating, the difficulty arises that chromium oxide, $Cr_2O_3$, is reactive only slightly and reacts completely only at a high temperature. Furthermore, lithium oxide, $Li_2O$, is comparatively volatile and hence the reaction products should, as a rule, not be heated excessively since decomposition will then take place, lithium oxide being expelled. According to the invention, in order to avoid the said disadvantages, one preferably proceeds in such manner that in a mixed solution of at least one iron compound and at least one chromium compound, which solution is at least substantially aqueous, at least part of the chemically bound iron and chemically bound chromium present therein is caused to deposit in the form of at least one chemical compound which is substantially insoluble in water by the aid of material producing an alkaline reaction in aqueous solution, the precipitate being separated from the solution and caused to enter into reaction with the lithium compound. As a rule, ammonia is passed into the mixed solution and preferably into the hot mixed solution. The resultant precipitation is preferably washed thoroughly with water, then dried, and subsequently mixed with the lithium compound and heated therewith to a temperature at which the desired material $Li_{0.5}Fe_{(2.5-a)}Cr_aO_4$ is formed.

Lithium carbonate is preferably used as the lithium-containing reaction component, the precipitation obtained from the mixed solution and which has been washed, dried and pulverised preferably being caused to enter into reaction with the lithium carbonate by heating it with finely-divided lithium carbonate to a temperature of preferably from 600° to 1150° C. in an atmosphere of a carbon-dioxide-containing gas under a carbondioxide pressure such that the lithium carbonate does not dissociate into lithium oxide and carbon dioxide at the temperature in question, so that evaporation of lithium oxide is avoided as much as possible. According to the invention, in order to enhance as much as possible the formation of a homogeneous reaction product, it is desirable that the reaction product should be cooled, pulverised and heated again, now to a temperature of preferably from 1000°–1150° C. in a gaseous atmosphere having a high oxygen content.

According to the invention, it is also possible for solutions of iron compounds and chromium compounds which can yield the corresponding oxides upon heating, to be heated until substantially mixed crystals of the oxides are obtained. Such compounds may be nitrates or salts of organic acids. The oxide material is then caused, as before, to enter into reaction with a lithium compound.

The invention will now be explained with reference to an example.

Example

A solution of ferrinitrate containing 7.81 g. of iron per 100 ccs. of solution was prepared from carbonyl iron and distilled nitric acid. Furthermore, a solution of chromi-nitrate $Cr(NO_3)_3$ containing 5.42 g. of chromium per 100 ccs. of solution was prepared from chromium oxide, $Cr_2O_3$, and distilled nitric acid. The calculated amounts of the two solutions were admixed and the mixed solution heated to boiling point. Subsequently ammonia was passed into the hot solution whilst stirring until alkaline reaction of the solution. The precipitation thus produced in the solution was removed by filtration, washed till nitrate ions were no longer perceptible in the washing water and then dried. Subsequently, the precipitation was pulverized in a mortar and mixed with the calculated amount of lithium carbonate, which contained 18.66% of lithium. The mixture was subsequently ground under benzene in an agate mill for 4 hours, removed from the benzene by filtration, dried and preheated for 2 hours at 700° C. in a gaseous atmosphere of equal volumes of oxygen and carbon dioxide. This was followed by cooling, whereafter the reaction product was pulverised and heated in a tubular oven for 2 hours at a temperature of 1150° C. in an oxygen atmosphere, followed by cooling in the same atmosphere.

Compounds of the formula $Li_{0.5}Fe_{(2.5-a)}Cr_aO_4$, in which the magnitude $a$ successively had the values 0.5, 0.75, 1.00, 1.25, 1.50, 1.60 and 2.00 were thus prepared.

Figure 2:
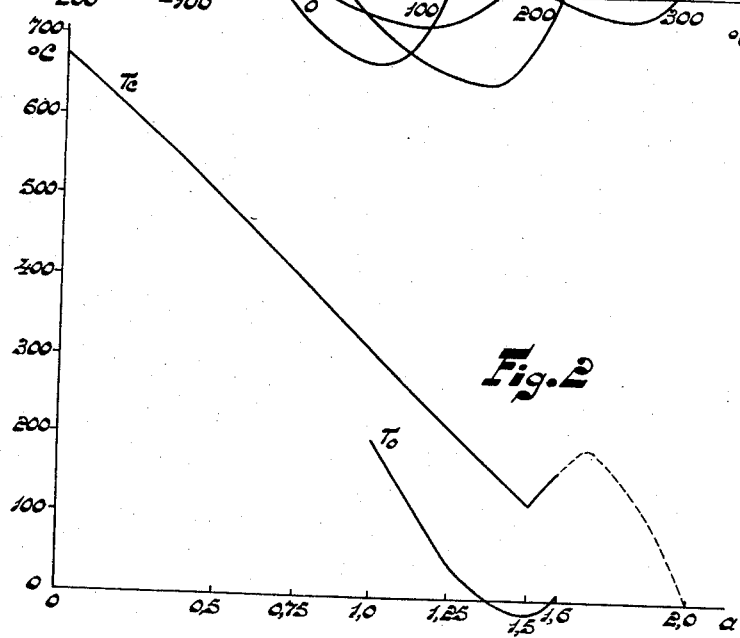

For the magnetic properties of the various compounds thus obtained we refer to Figs. 1 and 2 of the accompanying drawing.

Fig. 1 shows the variation in spontaneous magnetisation as a function of temperature for different compositions of magnetic material and hence for different values of the magnitude $a$. Fig. 2 shows the Curie-temperature $T_c$ in the upper curve and the inversion points $T_0$ of the tested materials in the lower curve.

What is claimed is:

1. A magnetic material of which the remanence may reverse its sign by the action of variation in temperature, consisting essentially of a compound of the formula $Li_{0.5}Fe_{(2.5-a)}Cr_aO_4$, wherein $a$ is a number between 0.9 and 1.7.

2. A method of preparing a compound of the formula $Li_{0.5}Fe_{(2.5-a)}Cr_aO_4$ wherein $a$ has a value between 0.9 and 1.7 which comprises the steps, heating, in an aqueous solution, in quantities at least equivalent to those indicated by said formula of a water soluble chromium compound, decomposable into a chromium oxide and a water soluble iron compound decomposable into an iron oxide, rendering said heated solution sufficiently alkaline to precipitate the chromium-iron reaction product, separating said precipitate from the solution, and heating said iron chromium compound, in the presence of a sufficient quantity of a lithium compound decomposable to a lithium oxide to form the compound of the indicated formula, in an atmosphere containing oxygen and a sufficient quantity of carbon dioxide to prevent loss of lithium.

3. The method of claim 2 in which the solution is made alkaline with ammonia.

4. The method of claim 2 in which the precipitate is caused to react with lithium carbonate by heating the mixture at a temperature between 600° C. to 1150° C. in an atmosphere containing oxygen and sufficient carbon dioxide to prevent any appreciable dissociation of the lithium carbonate.

5. The method of claim 2 in which the water soluble iron and chromium compounds are nitrates.

6. The method of claim 3 in which the precipitate is caused to react with lithium carbonate by heating the mixture at a temperature between 600° to 1150° C. in an atmosphere containing oxygen and sufficient carbon dioxide to prevent any appreciable dissociation of the lithium carbonate.

7. The method of claim 4 which contains the additional step of cooling, pulverizing and heating the resultant product in an atmosphere rich in oxygen at a temperature of from 1000° C. to 1150° C.

8. The method of claim 5 in which the water soluble iron and chromium compounds are nitrates.

9. The method of claim 7 which contains the additional step of cooling, pulverizing and heating the resultant product in an atmosphere rich in oxygen at a temperature of from 1000° C. to 1150° C.

References Cited in the file of this patent

"Ceramic Industry," vol. 58, No. 4, April 1952, pages 130, 131, 133 and 134.

"Ceramic Industry," vol. 58, No. 5, May 1952, pages 76, 77, 78 and 79.